Jan. 31, 1928.

J. J. McELROY ET AL 1,657,935

VIBRATION RECORDING APPARATUS

Filed Aug. 14, 1924     3 Sheets-Sheet 1

INVENTOR
John J. McElroy
Eugene L. Beecher
BY
Cooper, Kerr & Dunham
THEIR ATTORNEYS

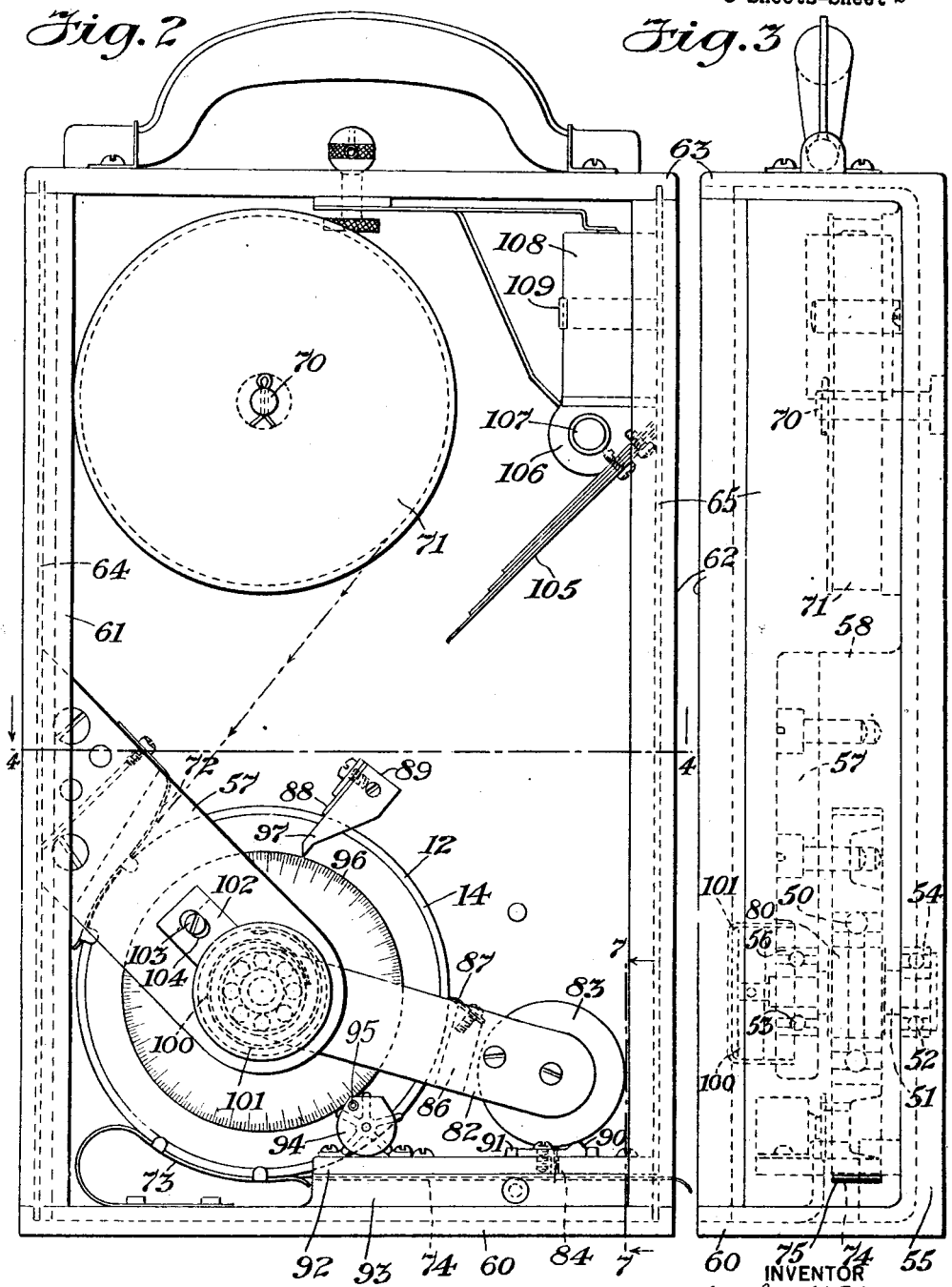

Jan. 31, 1928.
J. J. McELROY ET AL
1,657,935
VIBRATION RECORDING APPARATUS
Filed Aug. 14. 1924
3 Sheets-Sheet 3
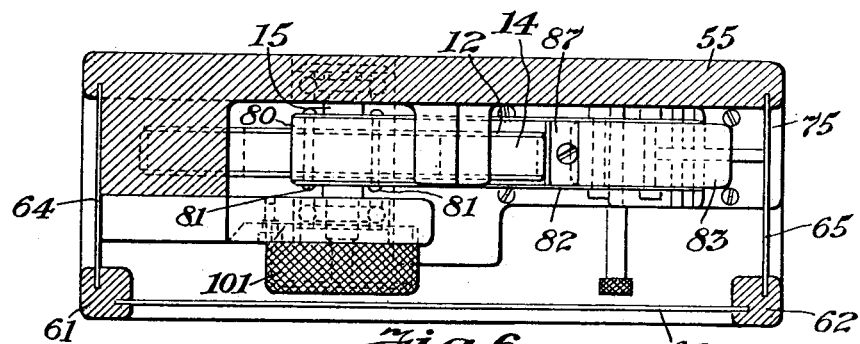
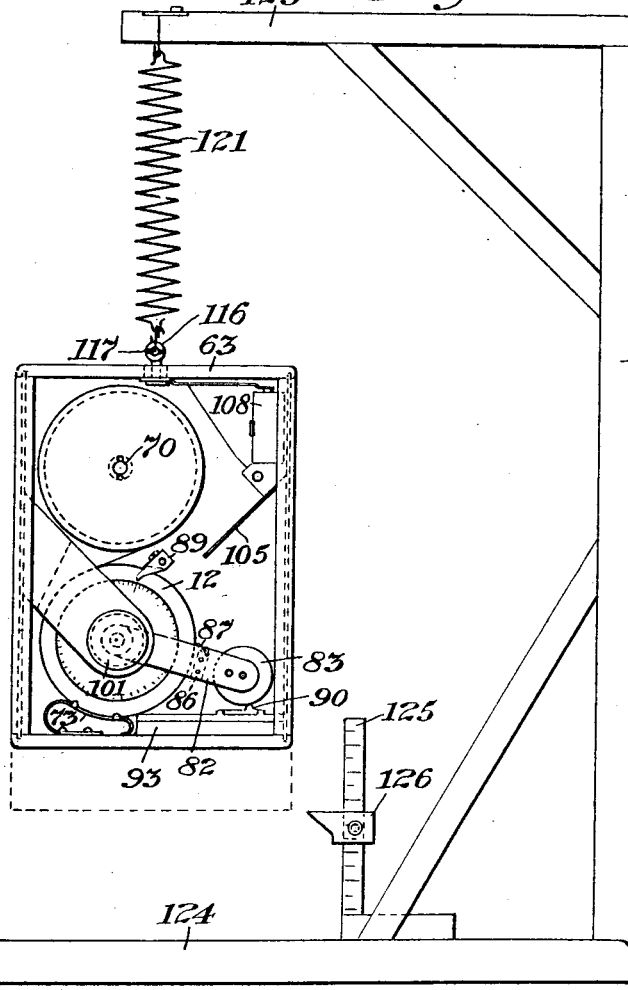
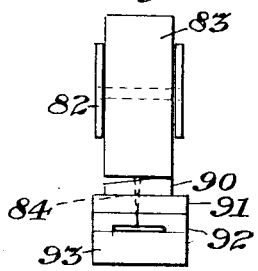
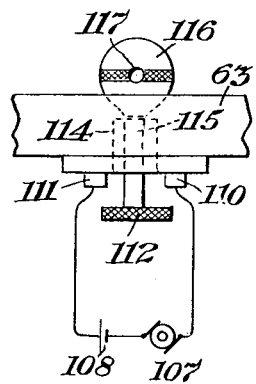

Patented Jan. 31, 1928.

1,657,935

UNITED STATES PATENT OFFICE.

JOHN J. McELROY AND EUGENE L. BEECHER, OF NEW HAVEN, CONNECTICUT, ASSIGNORS, BY MESNE ASSIGNMENTS, TO THE CLEVELAND PNEUMATIC TOOL COMPANY, OF CLEVELAND, OHIO, A CORPORATION OF OHIO.

VIBRATION-RECORDING APPARATUS.

Application filed August 14, 1924. Serial No. 731,948.

Our present invention relates to methods and apparatus for the testing of vibrations in various parts of stationary apparatus or of moving vehicles, and for the registering and the recording of the effects of such vibrations, and the device is applicable for use in the arts generally.

In the device of our invention we employ the inertia of a small mass of considerable weight and the reaction thereof upon the sudden subjection thereof to a force tending to move it with an accelerating motion to register the effects of the acceleration and to actuate mechanism for recording the relative values of various such forces.

It is an object of our invention to provide means for recording the comparative effects of vibrations of different forces on various parts of bodies subjected to vibrations such as the different parts of an automobile as in the comparative study of the efficacy of steel, pneumatic, and other springs and cushions and snubbers, etc., as applied to automobiles.

The further object is to provide a compact portable self-contained and adjustable recording instrument for permanently recording automatically on paper ribbon, vertical accelerations occurring in a vehicle or moving body exceeding any predetermined acceleration, so that the number of vibrations so occurring can be counted and the acceleration of any particular vibration can be determined.

A further object is to provide a means whereby the paper ribbon travel is not dependent on clockwork or other mechanical means but is actuated by the vibrations, thereby conserving the ribbon, also a means to verify the total length of ribbon travel relative to the accumulated intensity of the vibrations so that an error will at once be detected.

Other objects of our invention will appear from the following specification and the drawing forming a part thereof, and in which Fig. 1 is an elevational view of an embodiment of our invention showing means for counting and registering the number of vibrations affecting said means, means for registering and recording the effects of vibrations to indicate their relative forces, and means for recording the combined effects of vibrating forces which affect such means during a given period of time.

Fig. 2 is an elevational view of a modification of the device of Fig. 1.

Fig. 3 is a side elevation of the device of Fig. 2.

Fig. 4 is a sectional view along the line 4—4 of Fig. 2.

Fig. 5 is a detail view of suspending means of the device of Fig. 2 in part diagram.

Fig. 6 is an elevational view of testing and calibrating apparatus for the device of Fig. 2.

Fig. 7 is a detail elevational view taken substantially on the line 7—7 Fig. 2.

Figure 1:
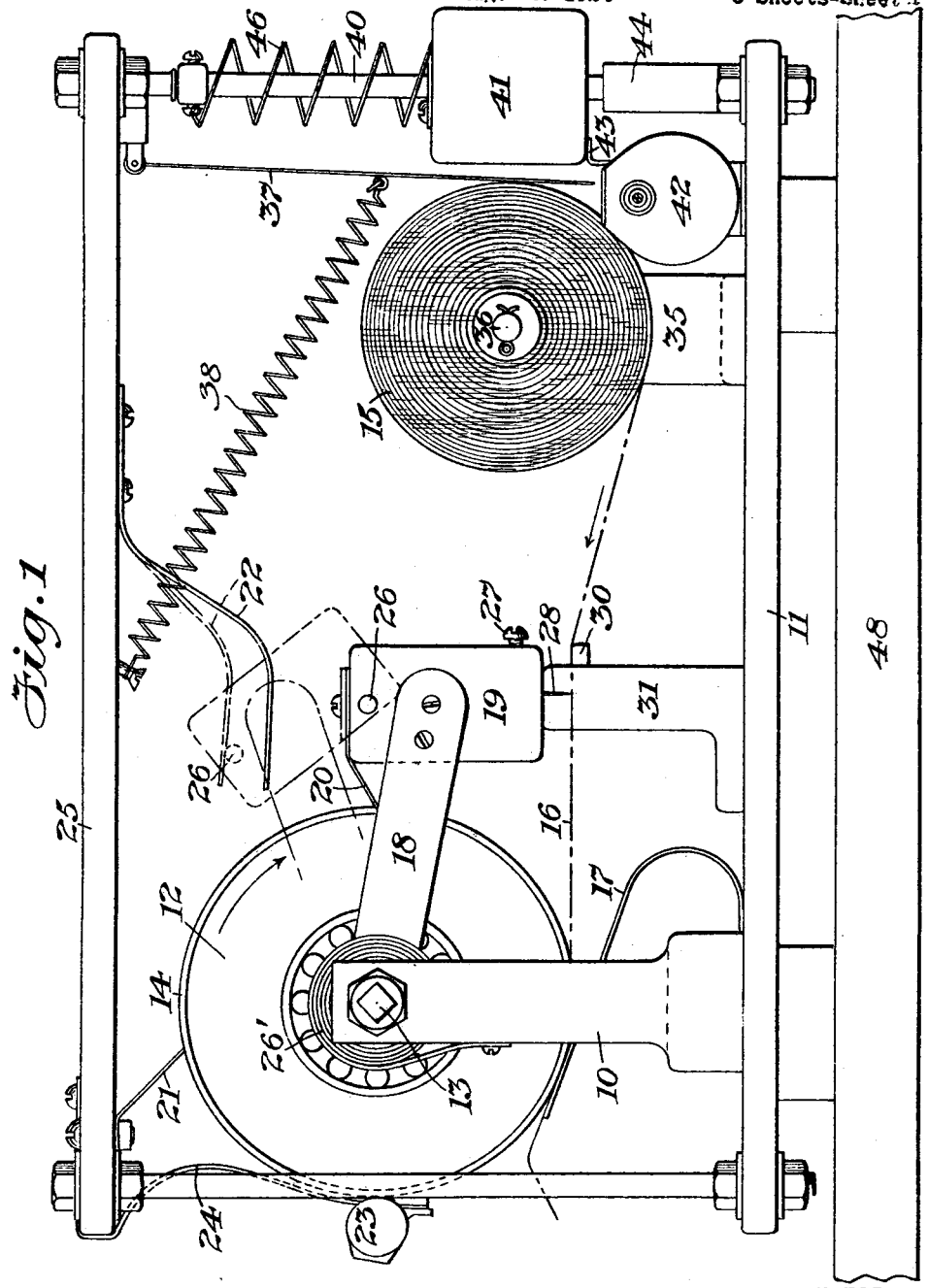

In the drawing the standard 10 mounted on base 11 supports the drum 12 on the spindle 13 through ball bearings. The drum 12 is faced circumferentially with a layer or thickness of rubber 14 for the purpose of frictionally engaging the paper ribbon 16 which is supplied from the roll 15 and is held against said drum by the spring 17 which is mounted on the base 11 and presses against the circumference of said drum 12. The arm 18 pivotally mounted on said spindle 13 carries on its outer end over the paper ribbon 16 and beyond the circumference of drum 12 a weight 19 which carries at its upper side a feeding pawl 20 which extends downwardly into contact with the circumference of drum 12 and is of spring material so that on a downward movement thereof it positively engages the circumference of drum 12 and causes it to be rotated through an arc in accordance with the movement of said weight 19, while on the upward movement of said arm and weight it slides back over said roller circumference without tending to actuate the latter. The spring pawl 21 mounted above the drum and bearing lightly against the circumference thereof allows rotations of said drum when actuated by said pawl 20 but acts as a positive stop to prevent any return or opposite movement of said drum on its axis. The spring 22 mounted above pin 26 on said weight 19 and in the line of its movement acts as a resilient stop therefor on excessive upward movement. The ratchet revolution counter 23 serves to record the circumferential travel of drum 12 and consequently to record the length of paper ribbon fed between said roller and said spring 17. Said counter 23 is held against the circumference of said roller by means of spring 24 which is mounted on the frame top 25 and to which is mounted said counter 23. The spiral spring 26' fixed at one end to standard 10 and at the other to said arm 18 tends to hold said arm 18 and said weight 19 at a normal position between that shown by the full lines and that shown by the dotted lines.

At the bottom of weight 19 the set screw 27 holds the needle 28 therein which extends downwardly over said paper ribbon 16 and when moved on said arm 18 into contact or proximity with said ribbon is in substantially the vertical position. The bar 30 mounted horizontally on standard 31 serves to hold paper ribbon 16 between roll 15 and drum 12 taut under said needle 28 and to limit the movement downwardly of said weight 19.

The standard 35 supports the paper roll 15 through spindle 36 and the spring brake 37 pressing against the edge of said paper roll 15 serves to hold the paper taut as it is drawn from the roll by drum 12. The spring 38 aids spring brake 37 in producing the necessary tension on the paper.

One of the vertical posts 40 between base 11 and top 25 is formed as a smooth rod of uniform cross section substantially throughout and serves as a guideway for the weight 41 bored to a sliding fit for and mounted on said post. On said base 11 is mounted the push tally counter 42 with its trigger 43 in the path of movement of said weight 41 on said post 40. The sleeve 44, of heavy soft rubber or the like, mounted on and about said post 40, has its upper limit at a distance below the normal position of said trigger 43 to allow the operation of the trigger by said weight 41 on a downward movement thereof, and acts as a buffer for said weight on such movements to prevent excessive movement in the downward direction after the actuation of said trigger thereby. The spiral spring 46 mounted loosely about post 40 and fixed at its upper end near the top of said post and at its lower end to said weight 41, serves to suspend said weight normally at a short distance above or in contact with said trigger 43 when the latter is at its uppermost or normal position.

The whole apparatus is fixed in the vertical position to the member 48, which is part of an automobile body or chassis.

In the use and operation of the device of Fig. 1 for the recording of vibrations set up in a given part of an automobile or other vehicle such as on the axle thereof or on some part of the chassis or body the apparatus is suitably fixed to such part as to the part 48 in the drawing and the paper ribbon 16 from the roll 15 inserted between spring 17 and the friction drum 12. Upon the passing of the vehicle over an irregularity in contour of the road or terrain passed over the sudden change in the elevation of said vehicle or part will result in the movement of said weights 19 and 41 with relation to the stationary parts of the apparatus due to the inertia thereof. Considering first the movement of weight 19 as positioned on the body of an automobile: As the vehicle passes over its path the weight 19 is vibrated about its axis through short strokes due to slight irregularities in said path and the needle 28 caused to puncture the ribbon 16 which is fed past said needle by the drum 12 which on the down strokes of weight 19 is moved by said feeding pawl 20. The number of irregularities is recorded by the number of punctures made and their relative distance apart recorded by the distance between such punctures. On passing over a depression in the path said weight 19 moves about its axis away from the paper ribbon due to the sudden fall of the vehicle with its running gear into the depression. Upon the rebound of the body with the springs thereof, weight 19 is thrown downwardly and the needle makes another puncture in the ribbon, and the upward movement of feed pawl 20 with said weight 19 with respect to its axis on said falling of the vehicle into the depression adds to the feeding stroke of said pawl on the downward movement which follows whereby a greater space occurs between the perforation made in the paper and the previous perforation than occurs between perforations made during vibrations caused by the smaller and more frequently occurring irregularities in the path of the vehicle. At each movement of said drum 12 by said pawl 20 the counter 23 is actuated, in turn thereby causing it to register the circumferential travel of drum 12 which is measured by it. Likewise on the striking of an abrupt rise or bump in the path of the vehicle needle 28 is caused to puncture the ribbon and then follows a space between such puncture and the next following caused by a long movement of the needle on the weight 19 caused by the reaction from the bump which results in a long feed of ribbon through said pawl 20 and drum 12 at the end of which said next following puncture is made. In this manner there is recorded on the ribbon a series of punctures separated by spaces proportional to the action caused by irregularities passed over by the vehicle.

During the action of the ribbon puncturing register and the travel counter (23) said weight 41, actuated by the same irregularities as actuate weight 19, serves to operate said tally counter 42 which registers the number of irregularities or bumps in the path of the vehicle or such of them as are great enough to be detected through the action of the particular embodiment of invention used.

An example of the use of the apparatus of our invention would be a study of the vibrations set up in different parts of an automobile as for instance those set up in the body thereof and those set up in the chassis. In such a study the apparatus of our invention is fixed to the body of the automobile and a run made over a given road at given speed or speeds. The apparatus is then fixed to the chassis and the same run made at the same speeds. The record of the vibrations made in both cases will afford a comparative study of vibrations made at the same time or under substantially the same conditions in different parts of the automobile. The study can also be made by attaching two or more such embodiments of our invention to different parts of the machine and the records of the vibrations occurring in different parts taken at the same time.

In Figs. 2, 3 and 5 of the drawings is shown a modification of the device of our invention in which the drum 12 is mounted through roller bearing 50 on the shaft 51 the ends of which are mounted through ball bearings 52 and 53 mounted in recess 54 formed in wall 55 and in the opening 56 formed in the support member 57 respectively, the latter being mounted on block 58 formed on said wall 55. Said wall 55 forms part of a casing comprising base 60, wall 55, posts 61 and 62, and top 63. The post 61, wall 55, top 63, and bottom 60 are slotted to receive the thin transparent side wall 64, and post 62, wall 55, top 63, and bottom 60 are slotted to receive the transparent side wall 65. Likewise top 63, posts 61 and 62, and bottom 60 are slotted to receive the thin transparent front wall 66. The wall 66 is slidably removable for adjustment of the apparatus, etc., and being transparent permits inspection thereof therethrough. The pin 70 supports the roll 71 of paper tape 16 which is fed around drum 12, under holding springs 72 and 73 and through longitudinal slot 74, and through opening 75 in said side wall 65.

On either side of the hub 80 which forms part of said shaft 51 are mounted by the rivets 81, 81 the arms 82, 82 which carry between them at their outer ends the flat disc shaped weight 83 which carries below its center at its lower limit of movement the projecting needle 84. The said arms 82, 82 carry between them the block 86 which carries the feed pawl 87 which on upward movement of said arms 82 on their pivot or bearings engages the outer rim 14 of said drum 12 which rim is made of resilient material such as rubber. A flexible stop feed pawl 88 mounted on block 89 and riding over the surface of rim 14 serves to prevent movement of drum 12 in the opposite direction.

The lower limit of movement of said disc 83 is determined by the projection 90 formed on block 91 which is mounted below said weight on the longitudinal plate 92 which in turn is mounted on the longitudinal block 93 formed as part of said bottom 60. Said projection 90 is positioned with respect to said disc 83 so that the disc strikes it at a point off the vertical projections of both the axis and the transverse mid-section line of said disc, in the drawing this point is shown as being outside the center of said disc with respect to its pivot (see Fig. 7). The purpose of such a positioning is to overcome any tendency for the disc to rebound upon its striking said projection 90.

In said block 93 is formed said longitudinal groove 74 through which is fed the paper strip from said drum 12. A star feeder counter 94, operated by the pin 95 mounted on said drum 12, is used to register the number of complete revolutions of said drum 12. Tractional revolutions are measured by the scale 96 on drum 12 and pointer 97 on block 89. From the number of revolutions made by drum 12 the length of paper 16 can be computed.

Fixed to the end of said shaft 51 projecting through arm 57 is a flat spiral spring 100 which is mounted about said shaft and the outer end of which is fixed to the inner side of cup 101 which has its lateral surface knurled for handling. The block 102 slidably held on said arm 57 by the screw 103 which passes through the radial slot 104 in said block serves to hold said cup in position under tension of said spring 100 when said block is pressed against said cup and said screw 103 is tightened, the surface of said block contiguous to said cup being curved to conform thereto.

The spring 105 mounted above said disc 83 and on block 106 serves to check said disc upon excessive upward movement thereof.

Within said block 106 is mounted the small electric light bulb 107 which is connected directly on one side to electric cell 108 which is supported on said block 106 by the encircling strap 109. From its other side said lamp is connected to contact 110 (see Fig. 5), mounted on the under side of top 63 near the center thereof. A similar contact 111 is mounted the other side of center from contact 110 and is connected to the other side of the cell 108. The contactor 112 is normally held away from said contacts by force of gravity. The head 116 on said stem 114 serves for suspending the whole device as and for the purpose hereinafter set forth.

In Fig. 6 is shown a standard 120 for suspending, for testing and calibrating purposes, the apparatus of Figs. 2, 3 and 4 by means of the spring 121 which is connected at its upper end to the arm 123 of said standard and at its lower end to said head 116. In this position the weight of the vibration recording device causes said contactor 112 to establish electrical connection between said contacts 110 and 111. Below the recording device and to one side thereof is mounted on the base 124 of the standard the vertical scale 125 having thereon the adjustable pointer 126.

The use and operation of the device of Figs. 2, 3 and 4 are the same as above described for the device of Fig. 1, the counter 42, and actuating means therefor, of the latter, however, not being contained in the former. In the latter device a greater degree of accuracy of operation is secured through the use of the disc 83 instead of the rectangular weight 19 due to the avoidance of shifting of the center of gravity upon the radial movement thereof on the respective supporting arm. In the device of Figs. 2 to 4 rebound of the weight is prevented by the dispersing of the reactive force caused by positioning the stop 90 off the vertical projection of the center of said disc 83. Also in the device of Figs. 2 and 4 the drum 12 is actuated and paper ribbon 16 is fed on the upward movement of disc 83 whereby the puncturing of said ribbon by needle 84 is performed while said ribbon is stationary.

In the calibration of the device of Fig. 2 it is suspended on the standard of Fig. 6 with the said spring 121 of a given reactive force for a given distance of lengthening thereof against tension or from its normal length, this distance being measured by said scale 125. With a given period of recoil of said spring and a certain amplitude or movement from normal upon release of tension the mass will be accelerated at a degree equal to the acceleration of gravity and upon such a positioning and release contactor 112 will drop, with the consequent de-energization of said lamp 107. The distance of movement of the mass necessary to produce acceleration equal to that of gravity having been determined, the recording device is set to operate at a given acceleration by repeating the movements and adjusting the tension of spiral spring 100 until upon the required movement said discs 83 will move above the paper strip below sufficiently to feed it a short distance and cause said needle 84 to puncture it.

What we claim is:

1. In a vibration recording machine, a resiliently suspended weight carrying a piercing needle, a ribbon mounted for travel past the point of said needle and in pierceable relation therewith, and means for producing such travel actuated by the movement of said weight and proportional to the amount of such movement.

2. In a vibration-recording device, a weight suspended resiliently to allow actuation thereof by forces whose vibrations are recorded, means actuated by said weight for recording the effects of movement of said weight on its resilient suspension and means actuated by the movement of said weight upon its resilient suspension to move said mark receiving means.

3. In a recording device, a resiliently suspended weight, marking means carried by said weight, means for receiving marks from said marking means upon movement thereof with said weight on its resilient suspension and means actuated by the movement of said weight upon its resilient suspension to move said mark receiving means.

4. In a vibration-recording device, a resiliently suspended weight, marking means carried by said weight, means for receiving marks made by said marking means and in operable relation therewith, and means actuated by the movement of said weight upon its resilient suspension to move said mark-receiving means.

5. In a vibration-recording device having a resiliently supported weight for receiving and transmitting vibration effects, a stop for said weight positioned off the projection of the center of gravity of said weight in the direction of the movement thereof.

In testimony whereof we hereto affix our signatures.

JOHN J. McELROY.
EUGENE L. BEECHER.